United States Patent [19]
Jaggar

[11] Patent Number: 5,680,599
[45] Date of Patent: Oct. 21, 1997

[54] PROGRAM COUNTER SAVE ON RESET SYSTEM AND METHOD

[76] Inventor: David Vivian Jaggar, 48 Mandrill Close, Cherry Hinton, Cambridge, CB1 4TN, United Kingdom

[21] Appl. No.: 585,247

[22] Filed: Dec. 22, 1995

Related U.S. Application Data

[63] Continuation of Ser. No. 301,790, Sep. 7, 1994, abandoned.

[30] Foreign Application Priority Data

Sep. 15, 1993 [GB] United Kingdom ............ 9319223

[51] Int. Cl.$^6$ ........................................... G06F 9/46
[52] U.S. Cl. ............................................... 395/591
[58] Field of Search ................................... 395/591

[56] References Cited

U.S. PATENT DOCUMENTS

| | | | |
|---|---|---|---|
| 3,736,566 | 5/1973 | Anderson et al. | 395/575 |
| 4,344,133 | 8/1982 | Bruce, Jr. et al. | 395/775 |
| 4,363,092 | 12/1982 | Abo et al. | 395/575 |
| 4,399,507 | 8/1983 | Cosgrove et al. | 395/375 |
| 4,521,847 | 6/1985 | Ziehm et al. | 364/184 |
| 4,709,324 | 11/1987 | Kloker | 395/725 |
| 4,740,969 | 4/1988 | Fremont | 371/12 |
| 4,907,150 | 3/1990 | Arroyo et al. | 395/575 |
| 4,970,641 | 11/1990 | Hester et al. | 395/400 |
| 5,003,462 | 3/1991 | Blaner et al. | 395/375 |
| 5,111,384 | 5/1992 | Aslanian et al. | 395/575 |
| 5,155,856 | 10/1992 | Bock et al. | 395/800 |
| 5,197,138 | 3/1993 | Hobbs et al. | 395/375 |
| 5,247,628 | 9/1993 | Grohoski | 395/375 |
| 5,287,523 | 2/1994 | Allison et al. | 395/725 |
| 5,355,490 | 10/1994 | Kou | 395/700 |

*Primary Examiner*—Krisna Lim
*Attorney, Agent, or Firm*—Albert C. Smith; Fenwick & West LLP

[57] ABSTRACT

A data processing apparatus and method are described in which a reset function for recovering from a system crash is provided. Upon activation of a reset signal (nRESET), the contents of a program counter (R15pc) are saved within another register (R14svc) prior to the reinitialization of the system. The contents of the register saving the program counter value are preserved through the reset operation to provide information to a person seeking to debug the system as to where a particular problem requiring the reset signal to be initiated occurred within the instruction address sequence.

8 Claims, 4 Drawing Sheets

Fig.2

PROGRAM COUNTER SAVE ON RESET SYSTEM AND METHOD

RELATED APPLICATIONS

This is a continuation of Prior application Ser. No. 08/301,790 filed on Sep. 7, 1994, now abandoned.

BACKGROUND OF THE INVENTION

1. Field of the Invention

This invention relates to data processing. More particularly, this invention relates to data processing apparatus and methods having a reset function, which, for example, may be activated to recover from a system crash or other malfunction.

2. Description of the Prior Art

It is usual to provide integrated circuit microprocessors with a reset function for use in reinitializing the system without having to go through the full procedure of removing the power from the microprocessor. In addition, the provision of a reset function may allow recovery from a system crash/malfunction with less loss of data/integrity than might otherwise be the case.

In known microprocessors, the reset function is activated by an externally applied reset signal (usually generated by manual activation of a switch on the device housing) that has a higher priority within the microprocessor than any instructions that may be executing and serves to stop execution of these instructions, commence execution of a reset routine of instructions located at a predetermined address and reinitialize the microprocessor either directly or via the reset routine.

Microprocessors typically utilize a program counter register to point to an instruction address of the currently executing instruction within the microprocessor. The reset signal is able to force execution of the reset routine by overwriting whatever instruction address may be in the program counter register with the predetermined start address of the reset routine. The reset routine is generally insensitive to the state of the microprocessor prior to activation of the reset signal such that activation of the reset signal will move the microprocessor from an unknown arbitrary state (probably malfunctioning) into a known state following reinitialization by the reset routine and from which further processing may progress.

The provision of a reset function is particularly useful during hardware and software development of data processing systems. During such development, malfunctions inevitably occur as bugs within the system are encountered. The debugging of data processing systems is a time consuming, expensive and highly skilled task.

SUMMARY OF THE INVENTION

It is an object of the invention to provide a data processing system that is easier to debug.

Viewed from one aspect this invention provides apparatus for data processing, said apparatus comprising:
(i) an instruction decoder for decoding instruction code words;
a program counter for indicating an instruction address of an instruction code word to be decoded;
(ii) a reset circuit responsive to a reset signal for triggering reinitialisation of said apparatus; and
(iii) program counter storage means responsive to said reset signal for storing a latest instruction address from said program counter prior to occurrence of said reset signal.

The invention recognizes and exploits that the content of the program counter immediately prior to the reset signal being applied can provide highly valuable information for use in a debugging process. More particularly, the address of the instruction that was executing at the time the reset signal was applied can either directly or indirectly assist in identifying the point within the software or hardware where a bug lies. The saving of this information upon application of the reset signal enables its subsequent recovery and analysis following the reinitialization of the apparatus. This capability eases the debugging process.

The action of the program counter storage means can be contrasted with the situation in known microprocessors in which the program counter contents are merely overwritten with the start address of the reset routine and any values that may be carried through the reinitialization process are likely to be merely artifacts of the reset and reinitialization itself.

It is usual that a data processing system will incorporate a plurality of data registers for holding data to be manipulated. In such systems, it is advantageous that the data registers are cleared in response to the reset signal.

This clearing of the data registers serves to place the data processing apparatus into a well defined known state from which further operation can progress.

A particular type of hardware bug that can be difficult to identify is that of short circuiting or misconnection of instruction address signal lines within the system. In order to assist with the identification of such problems, preferred embodiments of the invention include an instruction address incrementing circuit activated during application of said reset signal for generating an incrementing sequence of instruction addresses coupled to instruction address signal lines.

The instruction address incrementing circuit generates an incrementing sequence of instruction addresses coupled to the instruction address signal lines that may be externally monitored to determine whether any short circuits or misconnections are present in the instruction address signal lines.

In addition to a reset signal function, microprocessors are advantageously provided with an interrupt circuit responsive to an interrupt signal for forcing said program counter to indicate a storage address of a first instruction code word of an interrupt routine following execution of a currently executing instruction, said interrupt routine returning processing to the point at which said interrupt signal occurred upon completion of said interrupt routine.

The provision of an interrupt circuit responsive to interrupt signals allows a microprocessor to respond to asynchronous inputs and events, such as keyboard inputs. After the asynchronous input or event has been appropriately dealt with, control is returned to the main processing flow at the point at which the interrupt signal occurred.

It will be appreciated that it is advantageous that the reset signal should have a higher priority than the interrupt signal so that, if the two occur simultaneously (e.g. due to a bug that continuously asserts an interrupt signal), then the system will nevertheless be reinitializing.

Another preferred feature of such systems is that occurrence of said reset signal forces execution of any currently executing instruction to be abandoned.

In this way, the possibility of a processor becoming locked in the execution of a particular instruction from which it cannot be reset is avoided.

In an analogous manner to the advantages provided by the program counter storage means, it is advantageous to also provide a processing status register for holding data indicative of processing status; and processing status register storage means responsive to said reset signal for storing latest data indicative of processing status from said processing status register prior to occurrence of said reset signal.

A processing state register is convenient for indicating the occurrence of events such as overflows and carries within a microprocessor and may also be used to hold flags controlling optional operational modes of a microprocessor. In such circumstances, the content of the processing status register may be the cause of a particular bug and it will assist in the debugging process if this content is preserved through a reset operation.

It will be appreciated that the data processing apparatus discussed above could be fabricated as discrete physical components upon a circuit board. However, it is strongly advantageous for such apparatus to be implemented as an integrated circuit.

Viewed from another aspect this invention provides a method of data processing, said method comprising the steps of:

(i) decoding instruction code words at an instruction address indicated by a program counter;

(ii) reinitializing said apparatus in response to an applied reset signal; and (iii) in response to said reset signal, storing a latest instruction address from said program counter prior to occurrence of said reset signal.

The above, and other objects, features and advantages of this invention will be apparent from the following detailed description of illustrative embodiments which is to be read in connection with the accompanying drawings.

BRIEF DESCRIPTION OF THE DRAWINGS

FIG. 2 illustrates the data registers available in a main processing mode and a number of processing modes;

DESCRIPTION OF THE PREFERRED EMBODIMENTS

Figure 1:
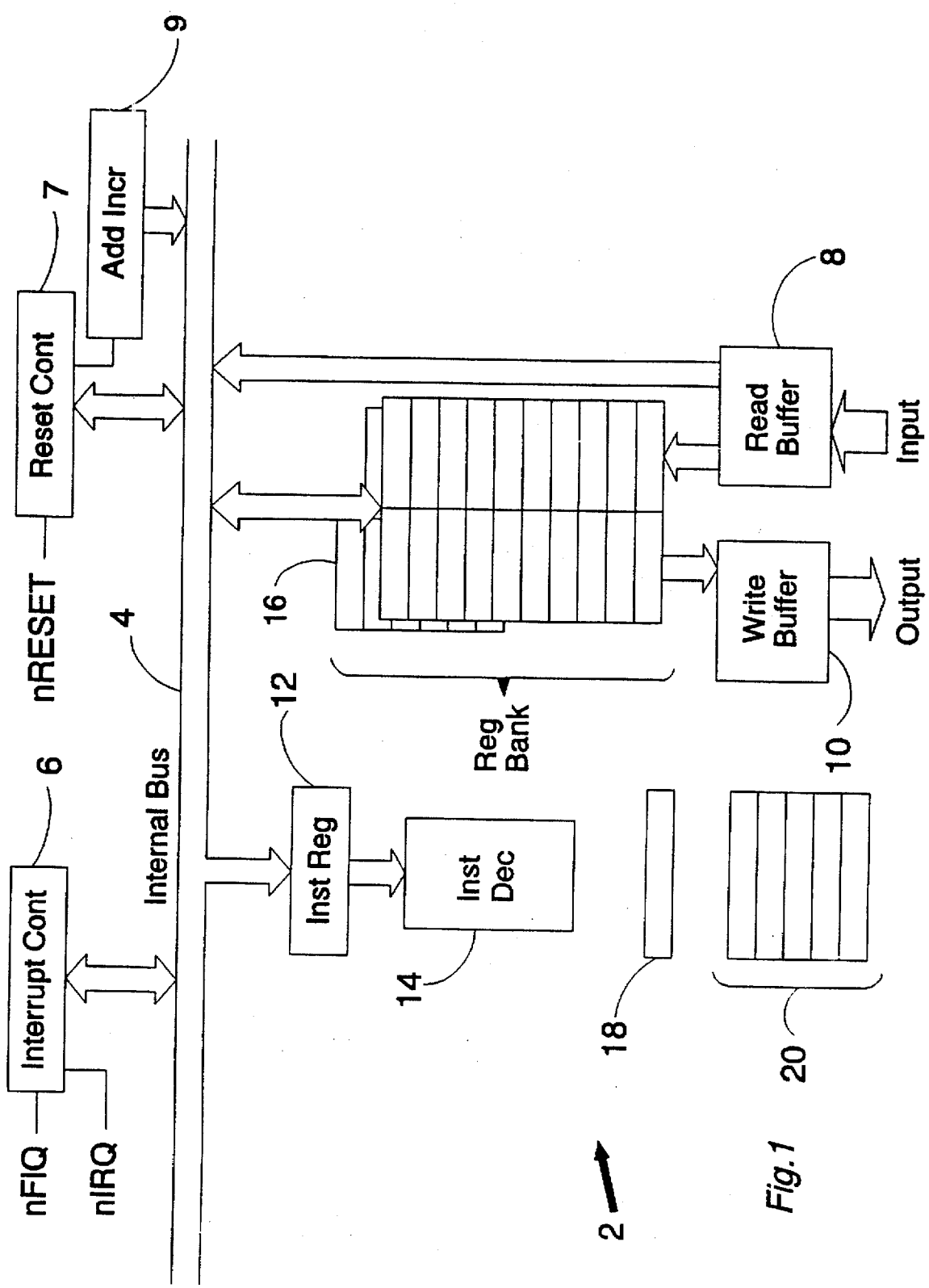
FIG. 1 schematically illustrates a microprocessor data processing apparatus (CPU) architecture.

FIG. 1 schematically illustrates a part of a CPU 2. The CPU 2 contains an internal bus 4 by which the various portions of the CPU 2 communicate. An interrupt controller 6 is attached to the internal bus 4. The interrupt controller 6 receives external inputs nFIQ and nIRQ that are signals indicating interrupt requests applied to external pins on the CPU package.

An external data bus communicates with a read buffer 8 and a write buffer 10 via which data (either data to be manipulated or instruction data) is respectively read into or written out from the CPU 2. Instruction data read into the read buffer 8 can be fed directly to the internal bus 4 and then to an instruction register 12 where it is stored and then decoded for action by an instruction decoder 14. Data to be manipulated may be input or output from a register bank 16 via the read buffer 8 and write buffer 10 respectively. The data within the registers of a register bank 16 is manipulated under control of decoded instructions using the instruction decoder 14.

A processing status register 18 stores processing status information (e.g. flags indicating whether fast or slow interrupts are allowed) and includes a section indicating the current processing mode of the CPU 2. A bank of saved processing status registers 20 are provided to store previous sets of active processing status data when a change is made between processing modes. Amongst other tasks, the contents of the processing status register 18 are used by the instruction decoder 14 to produce a composite register address that uniquely identifies one register within the register bank 16 upon which a particular instruction is to be carried out.

A reset controller 7 is also provided and is connected to the internal bus 4. The reset controller 7 responds to an externally applied reset signal nRESET (reset signal when nRESET=low) to trigger reinitialization of the CPU 2.

The execution of any instruction held within the instruction register 12 and being currently executed by the instruction decoder 14 is aborted. The reset controller 7 triggers loading of a predetermined instruction address (also known as a "reset vector") into a program counter register (see below) that indicates the address from which the instructions to be executed are taken. The value of the instruction address held within the program counter prior to loading of the reset vector is stored within a predetermined one of the registers of the register banks 16. In this way, the reset controller 7 acting in conjunction with the register bank 16 serves to provide a program counter storage means.

The reset controller 7 also activates an instruction address incrementing circuit 9 during application of the reset signal nRESET. Whilst the reset signal nRESET is held low, the instruction address incrementing circuit 9 outputs an incrementing sequence of instruction addresses onto the instruction address signal lines of the internal bus 4. In this way, monitoring of these instruction address signal lines can indicate if there is any short circuiting or misconnection amongst the instruction address signal lines. When the reset signal nRESET goes high, the reset controller 7 stops the action of the instruction address incrementing circuit 9.

The reset controller 7 also serves to clear the majority of the registers within the register bank 16 (notably not clearing the register holding the saved program counter value). In this way, the CPU 2 is placed into a known state following the reset signal. The clearing of the registers of the register bank 16 can occur either directly as a hardware function of the reset controller 7 or may be achieved by software instructions of the reset routine following the reset vector.

The reset controller 7 also triggers the saving of the contents of the processing status register into one of the bank of saved processing registers 20. This saved processing status data can then be retrieved, if required, during debugging.

Figure 2:
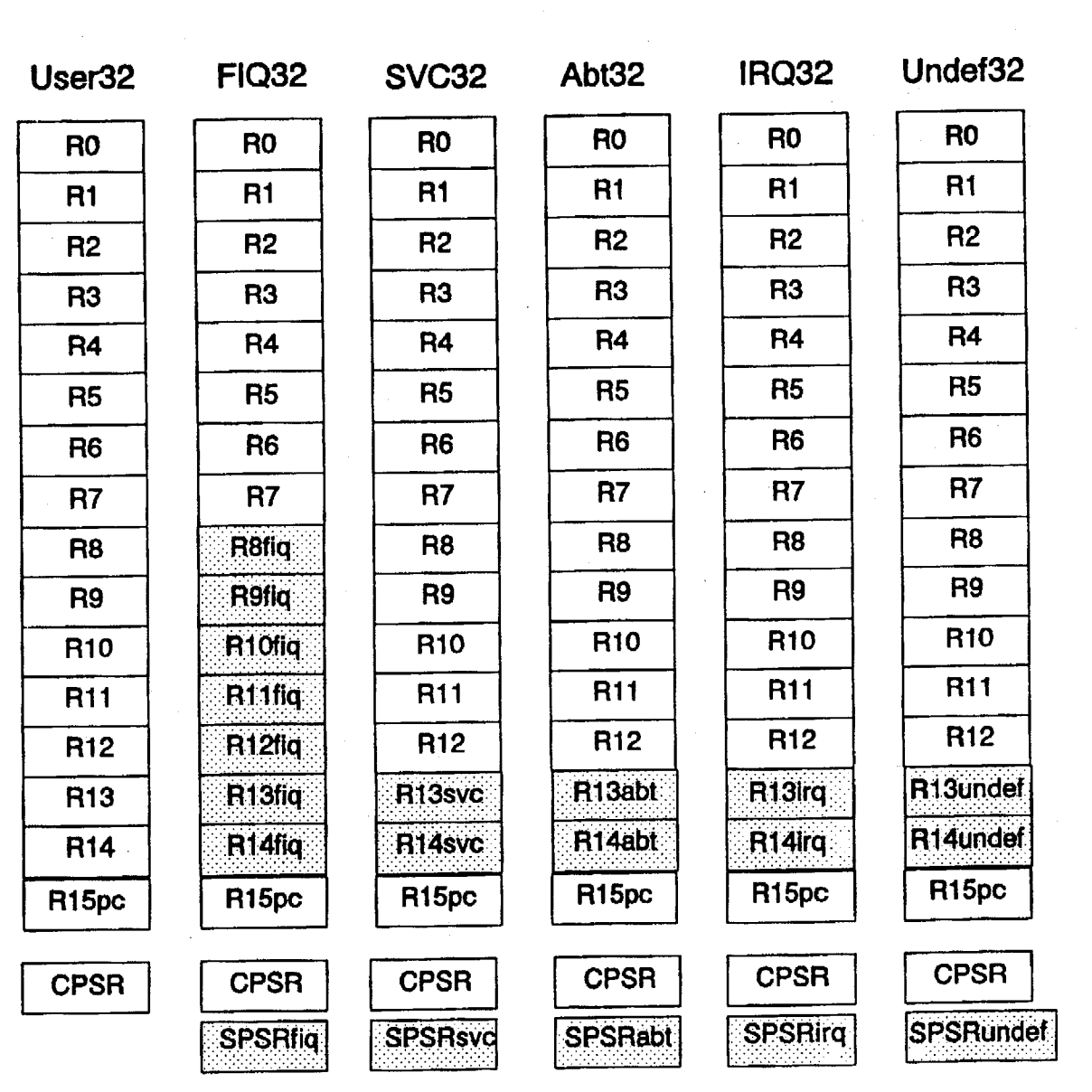

FIG. 2 illustrates the different registers available during a main processing mode User32 and various exception processing modes. In the main processing mode fifteen general purpose registers R0 to R14 are provided for data manipulation operations. A program counter register R15pc is provided to serve as a program counter indicating the current position within a sequence of instructions to be executed. A processing status register CPSR stores various flags indicating control parameters of the CPU 2 and five bits indicating the current processing mode. The mode User32 is provided for the execution of user application software.

The remaining five processing modes (which occur in response to the reset signal and various interrupt signals and may together be considered as exception modes) are:

supervisor (SVC32) which is entered when the processor is reset or a software interrupt instruction is executed;

undefined (Under32) which is entered when an undefined instruction enters the execution unit;

abort (Abt32) which is entered when the memory system aborts a memory access (either a data access or an instruction prefetch);

interrupt request (IRQ32) entered when the nIRQ pin is held low and an Ibit in the CPSR is clear indicating that such slow interrupt requests are allowed; and a fast interrupt request (FIQ32) entered when the nFIQ pin is held low and an Fbit in the CPSR is clear indicating that such fast interrupts are allowed.

Each of the exception modes SVC32, Abt32, IRQ32 and Under32 have two exception data registers associated with them that substitute for the main data registers R13 and R14 respectively when one of these modes is entered. R13 is the usual register used to store a stack pointer in both the main processing mode User32 and the exception processing modes. When one of the exception modes is entered the system stores the contents of R15pc in the R14 register of the mode being enter to serve as the return address register. This provides ready access to the return address when the exception handling code for that mode is exited.

Each of the exception handling modes has an associated saved program status register SPSR. These SPSRs save the contents of the CPSR from the previous mode and allow this to be restored to the CPSR when the previous mode is returned to.

The fast interrupt mode FIQB2 has seven exception data registers (R8fiq to R14fiq) as opposed to two exception data registers for the other exception processing modes. The result of this is that exception data registers R8fiq to R12fiq are available for immediate use upon entering the FIQ32 mode. It is also of note that the write buffer 10 of FIG. 1 is the equivalent of eight registers deep and so if the exception handling code of mode FIQ32 requires that the registers R0 to R7 be saved, then this can be achieved in a short time since they can be completely held within the write buffer 10. The CPU is provided with a load multiple instruction and store multiple instruction that allow any set of the sixteen active registers to be loaded and stored (e.g. LDM R1,{R0, R3,R4,R6,R14,R15pc} loads the registers inside the { } from an area of memory starting at address R1). The instruction decoder 14 controls the operation of the CPU to perform this operation.

Consider the example of moving between the User32 mode and the SVC32 mode. In this case, exception data registers R13svc and R14svc replace registers R13 and R14 respectively. The contents of R15pc from the User32 mode are saved in the R14svc register. The contents of the CPSR from the User32 mode are saved in the SPSRsvc and the contents of the CPSR updated to reflect the SVC32 mode which has been entered. In particular, the five bit field indicating the processing mode is updated. If, whilst in the SVC32 mode, a further exception occurs, such as an aborted memory access, then the Abt32 mode is entered from the SVC32 mode.

In this case, the R13abt and R14abt registers replace the respective R13svc and R14svc registers of the SVC32 mode. The contents of the R15pc register current in the SVC32 mode are saved in the R14abt register. As before, the contents of the CPSR in the SVC32 mode are saved in the SPSRabt.

When the exception handling is complete within the Abt32 mode, the CPU will restore the contents of R14abt to R15pc and the contents of SPSRabt to the CPSR. Restoring the contents of the CPSR to the state they had when the SVC32 mode was last executed will change the 5 bit field indicating the mode back to indicating the SVC32 mode which will automatically change the registers addressed such that the R13svc and R14svc registers are now addressed instead of the R13abt and R14abt registers. Since no processing has occurred upon the R13svc and R14svc registers since the SVC32 mode was exited, then the values within these registers will have been preserved. In combination with the fact that the contents of the R15pc are restored to that which they had when the SVC32 mode was exited, then the SVC32 mode processing will resume at the exact point at which it was exited (providing the contents of R0 to R12 have been restored if these were altered in the Abt32 mode.

In a similar way, when the SVC32 exception handling code has completed its task, the system will return to the User32 mode by substituting the R13 and R14 registers for the R13svc and R14svc registers. At the same time, the contents of the SPSRsvc will be restored to the CPSR.

The overall effect of the above is that an abort exception is nested within a supervisor exception from the main processing mode User32. The use of the exception data registers to substitute for corresponding ones of the main data registers means that the switching between modes can be achieved at high speed. The provision of the saved programming status registers allows a seamless switching and return to be achieved with reduced programming overhead.

As a further example, consider moving between the User32 mode and the SVC32 mode as the result of an externally applied reset signal nRESET. In this case, the exception data registers R13svc and R14svc again replace the registers R13 and R14 respectively. The contents of the program counter register R15pc from the User32 mode are saved in the R14svc register. The contents of the CPSR from the User32 mode are saved in the SPSRsvc and the contents of the CPSR updated to reflect the SVC32 mode which has been entered.

The reset controller 7 loads a reset vector (e.g. 00) into the program counter R15pc to commence execution of a reset routine. The reset routine can then clear the working registers R0 to R12.

Whilst the reset signal nRESET is held low, the reset controller 7 activates the instruction address incrementing circuit 9.

The remaining registers R8fiq to R14fiq, R13svc, R13abt, R14abt, R13irq, R14irq, R13undef, R14undef, SPSRfiq, SPSRabt, SPSRirq and SPSRundef may also be cleared by the reset routine using software instructions to place the CPU 2 into a completely known state prior to the recommencing of any processing.

No return is made to the User32 mode following the reset routine, since the CPU 2 has been reinitialized, various registers have been cleared and it is likely that the reason the reset was initiated was because of a system crash within the User32 mode.

Figure 3:
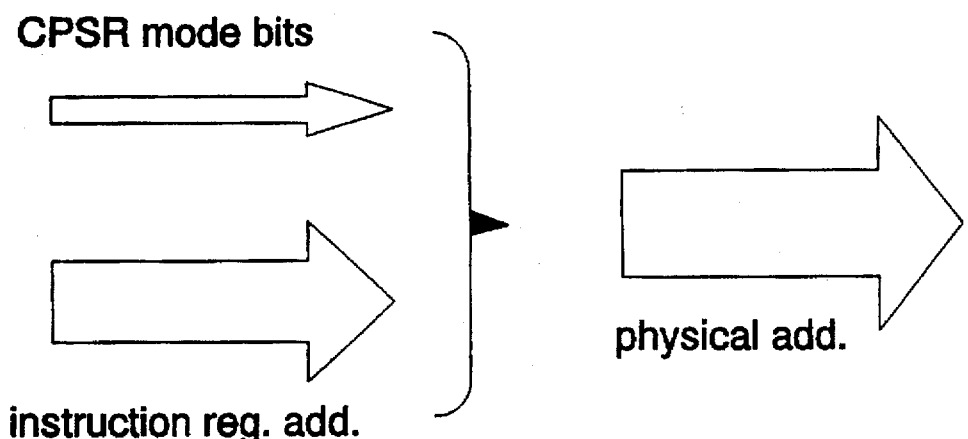
FIG. 3 illustrates how a physical register address is derived from mode bits from the programming status register and from the instruction being executed.

FIG. 3 illustrates how a physical register address identifying a particular one of the main data registers and the exception data registers is derived from a combination of the mode bits from the CPSR and an instruction register address as decoded by the instruction decoder 14 of FIG. 1. In fact, these various addresses will be used as inputs to a register address decoder rather than going through an intermediate stage of producing a physical register address.

Figure 4:
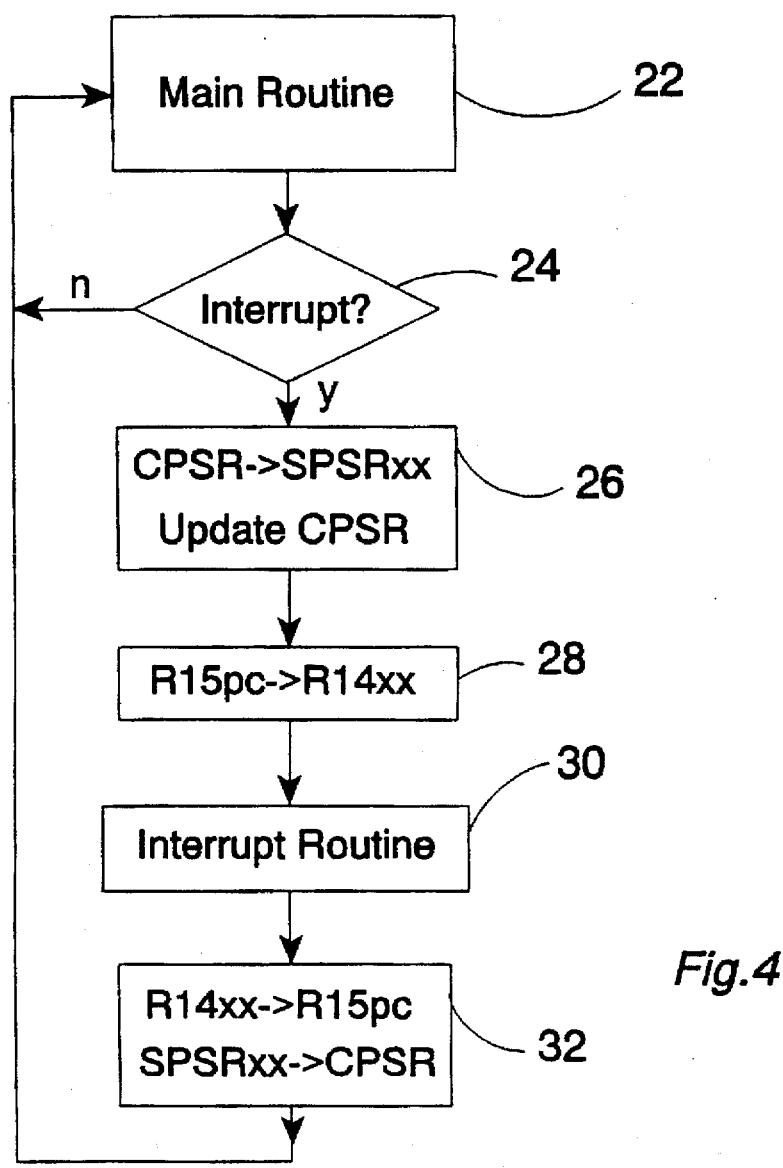
FIG. 4 shows a flow diagram illustrating the switch between a main processing routine and an interrupt processing routine.

FIG. 4 schematically illustrates the processing that occurs when moving between a main processing mode and an interrupt processing mode. The data processing apparatus is performing a main processing routine 22. A step 24 tests as to whether an interrupt has occurred. If no interrupt has occurred, then the main processing routine 22 continues. If an interrupt has occurred, then control passes to step 26.

In step 26 the contents of the CPSR are stored to the SPSR of the relevant exception mode that has been identified. The contents of the CPSR are then changed to reflect the new processing mode that has been entered. At step 28 the contents of the program counter R15pc from the previous mode are saved in the R14xx of the exception mode that has been entered. Steps 26 and 28 take place in response to a single instruction.

When the interrupt mode has been entered after step 28, the system executes an interrupt routine 30. At the end of the interrupt routine 30, the contents of the register R14xx are returned to the program counter R15pc and the programming status data of the previous mode is restored from the SPSRxx to the CPSR. This is step 32, after which a return is made to the main routine 22 at the point indicated by the newly restored R15pc.

Figure 5:
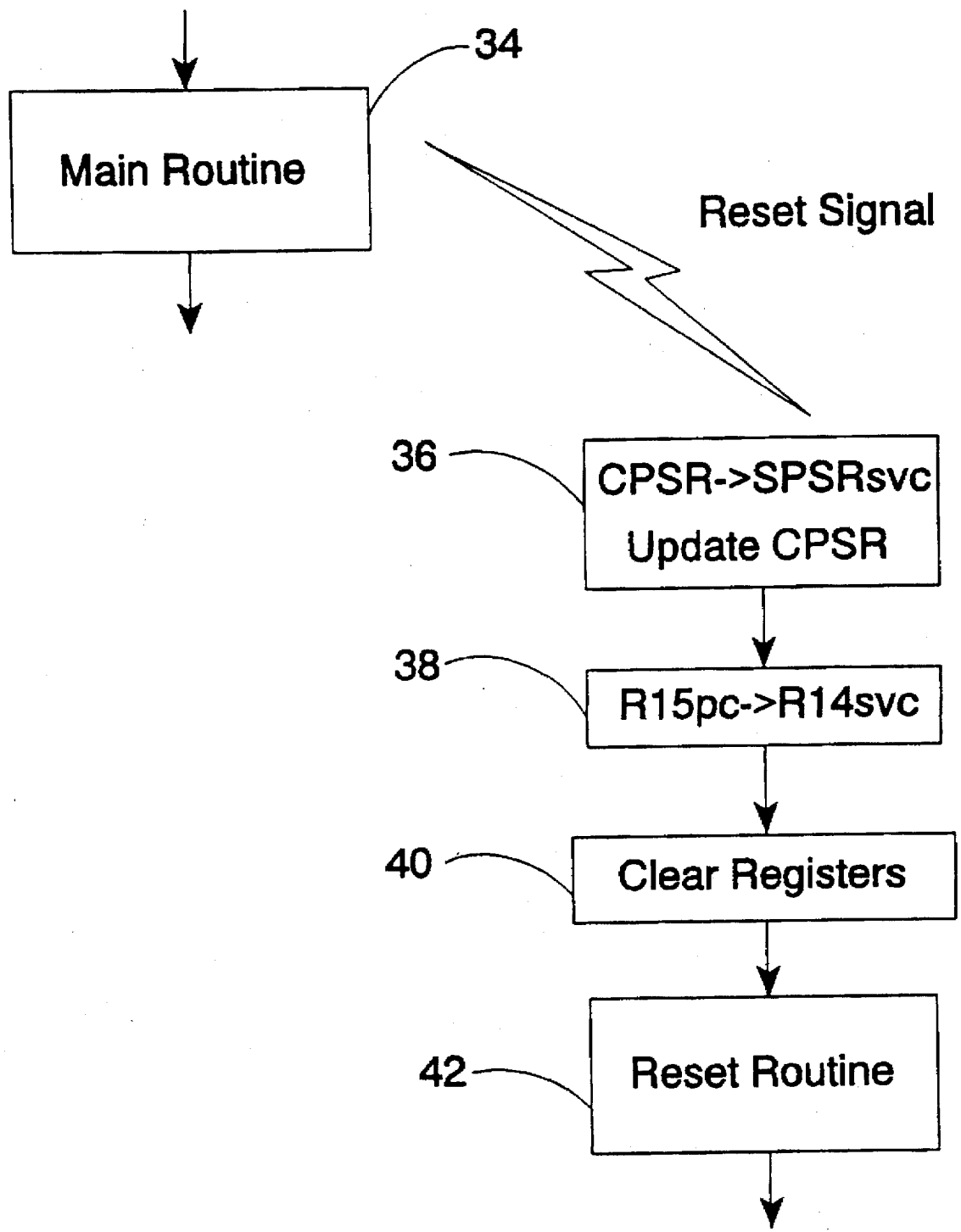
FIG. 5 shows a flow diagram illustrating the operation that occurs following application of a reset signal.

FIG. 5 illustrates the sequence of events during a reset operation. The CPU is executing the main routine at step 34. This execution may be erroneous ("hung") execution or normal execution. An external reset signal is then applied that aborts the currently executing instruction and starts the reset process.

At step 36, the contents of the programming status register CPSR from the main routine 34 are stored within the saved programming status registers SPSRsvc and the current programming status register CPSR is updated to reflect the entry into the SVC mode.

At step 38, the contents of the program counter R15pc are stored within the register R14svc from which they may subsequently be recovered by a debugging program or the like.

At steps 40 and 42, the unwanted registers within the register bank 16 are cleared and the remainder of a reset routine, which may include certain signals being driven off from the CPU 2 is activated. No attempt is made to return to the main routine 34 after completion of the reset routine 42.

Although illustrative embodiments of the invention have been described in detail herein with reference to the accompanying drawings, it is to be understood that the invention is not limited to those precise embodiments, and that various changes and modification can be effected therein by one skilled in the art without departing from the scope and spirit of the invention as defined by the appended claims.

I claim:

1. Apparatus for data processing, said apparatus comprising:

(i) an instruction decoder for decoding instruction code words;

(ii) a program counter, coupled to said instruction decoder, for indicating an instruction address of an instruction code word to be decoded;

(iii) an interrupt circuit, coupled to said program counter and responsive to an interrupt signal applied to said apparatus for forcing said program counter to indicate a storage address of a first instruction code word of an interrupt routine following execution of a currently executing instruction, said interrupt routine returning processing to the point at which said interrupt signal occurred upon completion of said interrupt routine;

(iv) a reset circuit, coupled to said program counter and responsive to a reset signal externally applied to said apparatus, for triggering reinitialization of said apparatus whereby said apparatus is placed in a reset state substantially independent of a state of said apparatus at which said reset signal occurred, after said reinitialization; and (v) program counter storage means, coupled to said reset circuit and reponsive to said reset signal, for storing a latest instruction address from said program counter, prior to occurrence of said reset signal, and for maintaining said latest instruction address during said reinitialization.

2. Apparatus as claimed in claim 1, further comprising:

a plurality of data registers, coupled to said instruction decoder, for holding data to be manipulated, said data registers being cleared in response to said reset signal.

3. Apparatus as claimed in claim 1, further comprising:

instruction address signal lines coupled to said program counter; and an instruction address incrementing circuit activated during application of said reset signal for generating an incrementing sequence of instruction addresses coupled to said instruction address signal lines.

4. Apparatus as claimed in claim 1, said apparatus being an integrated circuit.

5. Apparatus as claimed in claim 1, wherein said reset signal has a higher priority than said interrupt signal.

6. Apparatus as claimed in claim 1, wherein occurrence of said reset signal forces execution of any currently executing instruction to be abandoned.

7. Apparatus as claimed in claim 1, further comprising:

a processing status register, coupled to said instruction decoder, for holding data indicative of processing status; and processing status register storage means, coupled to said processing status register and responsive to said reset signals, for storing latest data indicative of processing status from said processing status register prior to occurrence of said reset signal.

8. A method of operating an apparatus for data processing, said method comprising the steps of:

(i) decoding instruction code words at an instruction address indicated by a program counter;

(ii) forcing said program counter to indicate a storage address of a first instruction code word of an interrupt routine following execution of a currently executing instruction in response to an interrupt signal applied to said apparatus, said interrupt routine returning processing to the point at which said applied interrupt signal occurred upon completion of said interrupt routine; and (iii) reinitializing said apparatus and storing in a program counter storage means a latest instruction address from said program counter prior to occurrence of said reset signal, in response to said reset signal externally applied to said apparatus, such that said latest instruction address is available for subsequent diagnostic analysis after the completion of said reinitialization of said apparatus, and said apparatus is placed in a state substantially independent of a state of said apparatus at which said reset signal occurred, and processing not being returned to the point at which said reset signal occurred after said reinitialization.

* * * * *